Dec. 17, 1935.  J. E. BATIE  2,024,328
VEHICLE WHEEL BRAKE
Filed April 9, 1930  2 Sheets-Sheet 1
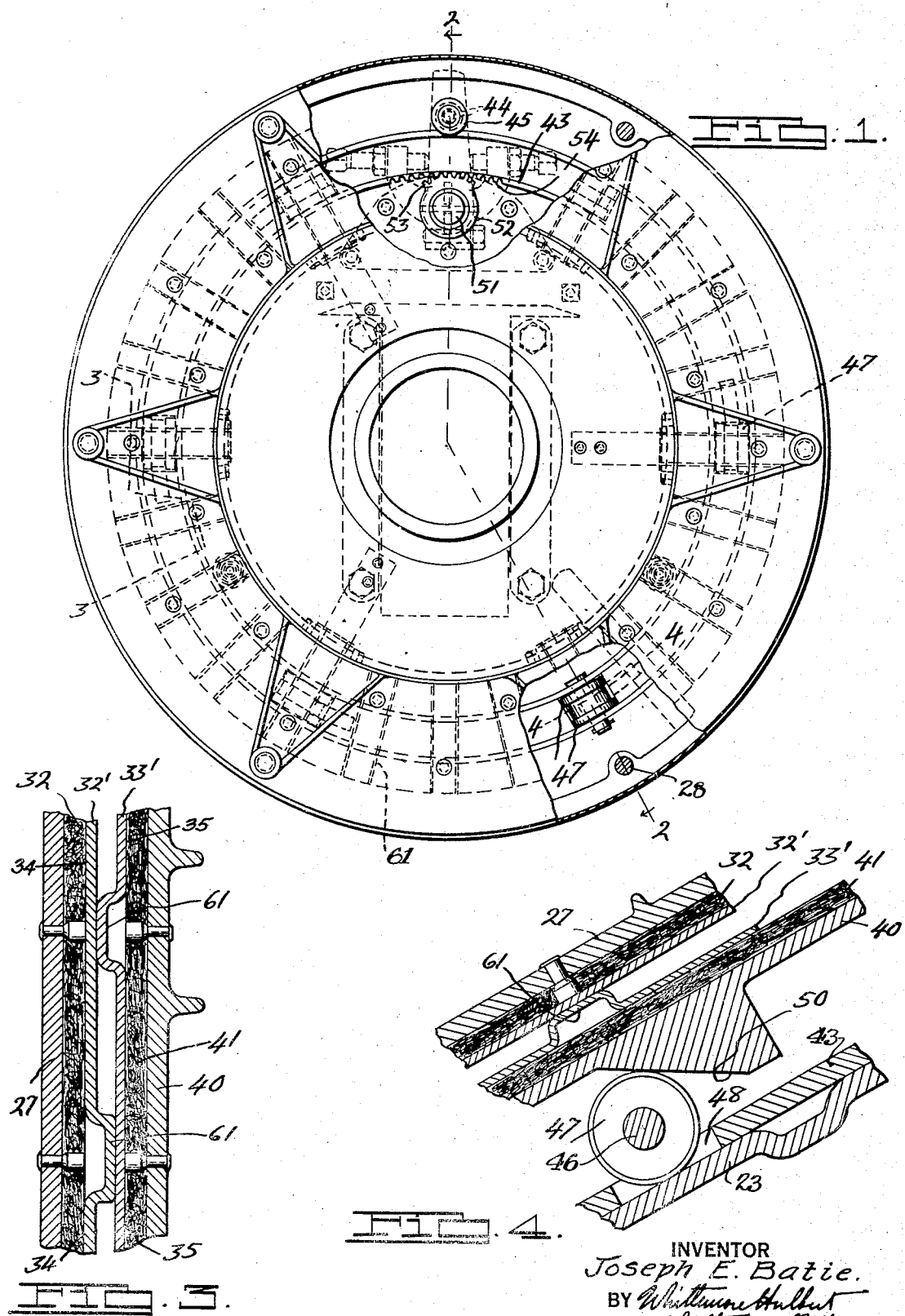
INVENTOR
Joseph E. Batie.
BY
ATTORNEYS.

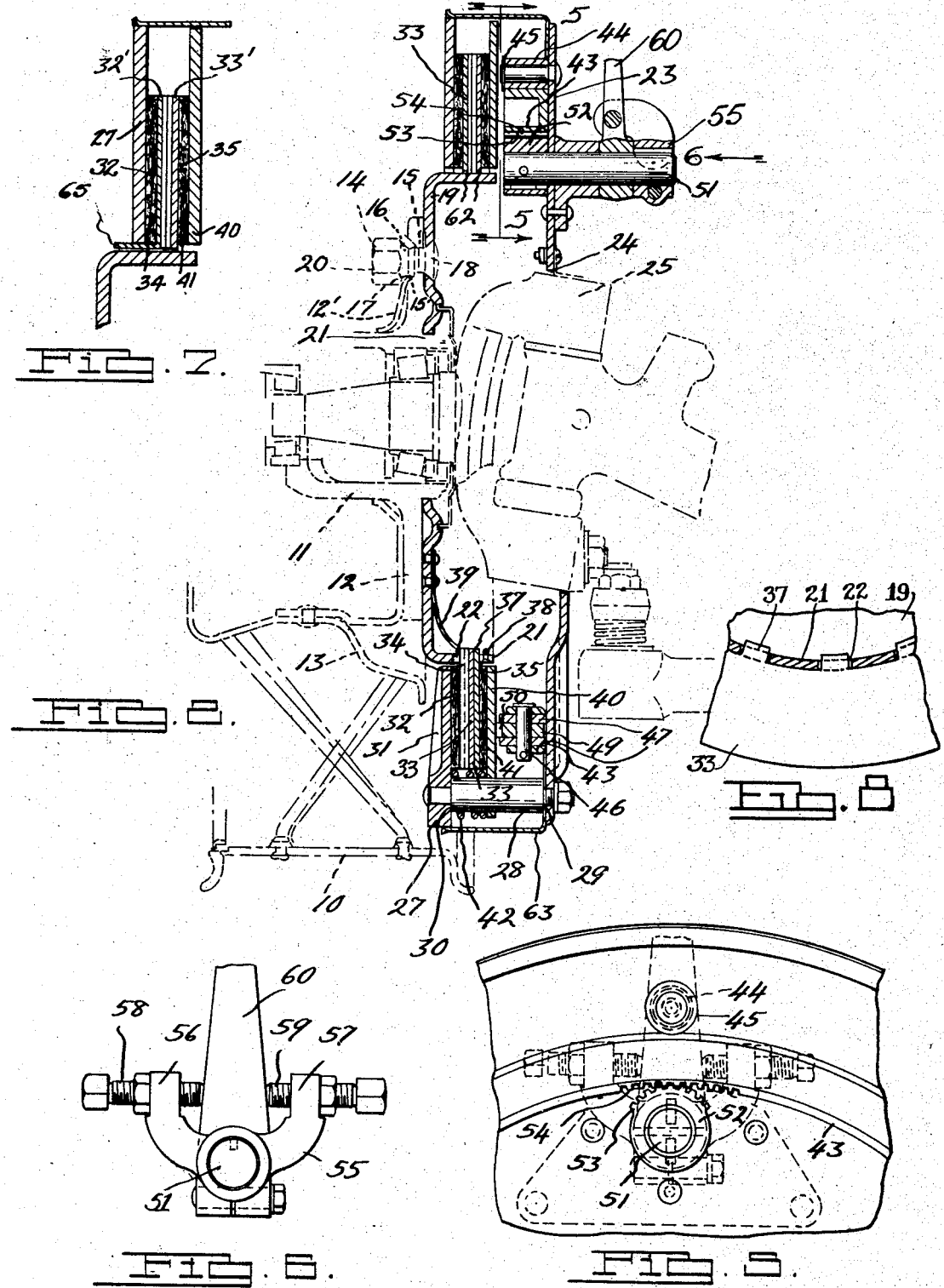

Patented Dec. 17, 1935

2,024,328

UNITED STATES PATENT OFFICE 2,024,328

VEHICLE WHEEL BRAKE

Joseph E. Batie, Detroit, Mich., assignor, by mesne assignments, to The Kelsey-Hayes Wheel Company, Detroit, Mich., a corporation of Delaware Application April 9, 1930, Serial No. 442,898

6 Claims. (Cl. 188—72)

This invention relates generally to improvements in vehicle wheels and has particular reference to vehicle wheel brakes of the radial type.

One of the principal objects of this invention is to provide a vehicle wheel brake construction having braking surfaces extending radially of the wheel and further having means for cooling the surfaces upon rotation of the wheel.

Another object of the invention resides in the provision of adjustable means for taking up the wear of the braking surfaces without altering the length of the various brake rods.

A further object of this invention is to provide anti-friction means for positively moving the braking surfaces into engagement for braking the wheel. With this arrangement comparatively little effort is required to apply the brakes and a more positive braking action is accomplished.

A still further object of the invention is to provide a brake having cooperating braking surfaces so arranged with respect to each other that upon actuation of the brake the area of contact gradually increases with the result that a smoother braking action is realized.

With the foregoing as well as other objects in view, the invention resides in the novel features of construction illustrated and about to be described.

In the drawings:

Figure 1 is a fragmentary side elevational view of a vehicle wheel equipped with brake mechanism constructed in accordance with this invention.

Figure 2 is a sectional view taken on the line 2—2 of Figure 1.

Figure 3 is a sectional view taken on the line 3—3 of Figure 1.

Figure 4 is a sectional view taken on the line 4—4 of Figure 1.

Figure 5 is a sectional view taken on the plane indicated by the line 5—5 of Figure 2.

Figure 6 is an end elevational view of the brake actuating rockshaft showing my improved adjustable means associated therewith.

Figure 7 is a fragmentary elevational view of a slightly modified form of the invention.

Figure 8 is a fragmentary elevational view illustrating the manner in which the braking members are mounted for movement axially of the wheel.

Referring now to the drawings and with special reference to Figure 2, it will be noted that there is illustrated therein a vehicle wheel 10 comprising a hub 11 having a radially extending fixed flange 12 intermediate the ends thereof. Mounted upon the hub 11 at one side of the flange 12 is a wheel body member 13 of any suitable construction. The wheel body member is secured to the fixed flange 12 at circumferentially spaced points by means of the securing elements 14 extending through correspondingly spaced apertures 15 and 15', respectively in the fixed flange 12 and attaching flange 12' extending inwardly from the hub shell. The fastener members 14 are provided with shoulders 16 intermediate the ends thereof engageable with the portions of the rear side of the attaching flange 12' surrounding the openings 15' therein and cooperating with the nuts 20 on the elements 14 at the front side of the flange to secure the wheel body to the hub. The rearwardly projecting end portions 18 of the elements 14 extend through suitable apertures formed in a plate 19 and are provided with head portions engageable with the rear sides of the plate. The arrangement is such that the nuts 20 and elements 14 also serve to clamp the plate 20 to the rear side of the fixed flange 12. As shown in Figure 2, the plate 19 is centrally apertured for sleeving over the hub and terminates at the outer side thereof in a rearwardly projecting flange 21 having circumferentially extending spaced slots 22 therein, the purpose of which will be more fully hereinafter set forth.

The brake mechanism about to be described is shown in connection with a front steering wheel of the vehicle and comprises a back plate 23 having an opening 24 therein through which the steering spindle 25 projects and is secured to the spindle in any suitable manner. The peripheral portions of the back plate 23 are connected in spaced relation to the outer portions of an annular disk member 27 by means of the circumferentially spaced pins 28. The pins 28 extend parallel to the axis of the wheel and are provided with axially spaced shoulders 29 and 30 adapted to engage the inner surfaces of the plate 23 and disk 27, respectively, to maintain the latter in proper spaced relation to the former. The disk 27 is preferably reinforced by means of the webs 31 projecting forwardly from the front face of the disk and the rear face of the disk is provided with a braking surface 32 extending substantially radially of the wheel.

Slidably mounted with respect to the disk 27 in a manner to be presently described is an annular member 33 having the major portions thereof arranged within the space between the plate 23 and disk 27. The annular member 33 is preferably formed of complementary annular plates 32' and 33' extending radially of the wheel and having the front and rear faces respectively thereof forming opposed braking surfaces 34 and 35. In order to support the annular member 33 in assembled relation with the wheel and permit movement of the same relative to the disk 27, the inner portions of the member are formed with a series of circumferentially spaced inwardly extending projections 37 engageable within the slots 22 formed in the rearwardly extending flange 21 on the plate 19 and prevented from movement out of the latter slots by the stops 38 mounted upon the flange 21 at the rear ends of the slots. It will be noted from Figure 2 that the stops 38 are so arranged that when the plates 32' and 33' are in their rearwardmost position in engagement with the stops the braking surface 34 on the plate 32' is spaced slightly from the cooperating braking surface on the disk 27. The aforesaid cooperating braking surfaces are normally held in spaced relation to each other by suitable leaf springs 39 having the inner ends thereof secured to the plate 19 and the outer ends engaging the projections as clearly illustrated in Figure 2.

For sliding the annular member 33 relative to the disk 27 to bring the braking surfaces 32 and 34 into engagement, I provide a second disk member 40 extending radially of the wheel and coaxially of the hub in the same manner as each of the members 27 and 33. The disk 40 is arranged in the space between the back plate 23 and member 33 and is formed with a series of openings adjacent the periphery thereof for slidably receiving the pins 28 and is provided with a braking surface 41 adapted to engage the braking surface 35 on the member 33. The two braking surfaces 35 and 41 are normally maintained in spaced relation to each other by means of coil springs 42 surrounding the pins 28 intermediate the disk 27 and front face of the disk 40. The arrangement is such that when the disk 40 is moved forwardly on the pins 28 against the action of the springs 42, the braking surface 41 will engage the braking surface 35 with the result that continued movement of the disk 40 effects a forward movement of the member 33 to engage the braking surface 34 thereon with the braking surface 32 on the disk member 27. In this connection it will be noted from Figure 2 that the braking surface 32 is inclined slightly relative to the braking surface 34 so as to effect a gradual engagement of braking surfaces upon application of the brake and thereby obtain a smoother braking action.

For actuating the disk 40 to move the same axially of the wheel into engagement with the member 33, I provide anti-friction mechanism. This mechanism is more clearly illustrated in Figures 1 and 2 and comprises an annular forwardly opening substantially channel-shaped ring 43 oscillatable about the axis of the hub. The ring 43 is supported upon the back plate 23 by means of a series of rollers 44 secured to the back plate at circumferentially spaced points and provided with flanges 45 overlapping the edges of the legs of the channel-shaped ring 43 to maintain the latter in position against the front surface of the back plate 23. Journaled in the legs of the ring 43 at points intermediate the rollers 44 are suitable pins 46 having rollers 47 thereon adapted to extend through suitable slots 48 formed in the base of the ring 43 and engage the front face of the back plate 23. The arrangement is such as to prevent the rear surface of the ring 43 from contacting with the adjacent surface of the back plate 23 and thereby reduce the frictional resistance between the parts to the minimum. Mounted upon the pins 46 intermediate the rollers 47 are suitable rollers 49 adapted to engage cam surfaces 50 formed upon the rear surface of the disk 40. The construction is such that when the ring 43 is oscillated in a direction to apply the brake, the rollers 49 engage the cam surfaces 50 and owing to the configuration of the latter surfaces effect a movement of the disk 40 forwardly in the manner hereinbefore set forth to engage the cooperating braking surfaces 32, 34, and 35 and 41.

Oscillation of the ring 43 is accomplished by means of a rockshaft 51 carried by the back plate 23 and having a pinion 52 secured to the forward end thereof in advance of the plate 23. The pinion is provided with teeth 53 adapted to mesh with corresponding teeth 54 formed on the inner flange or leg of the ring 43. The rear end of the rockshaft is connected to the brake rods (not shown) in the following manner. Secured to the rear end portion of the rockshaft 51 is a yoke member 55 having spaced forwardly projecting arms 56 and 57. The arms 56 and 57 are provided with adjustable elements 58 and 59, respectively, having shank portions threadedly engaging the arms and extending toward each other. The inner ends of the adjusting elements 58 and 59 are adapted for alternative engagement with a rock lever 60 having one end freely rotatably mounted upon the rockshaft 51 and the opposite end connected to the brake rods (not shown). Thus, it will be observed that the lever 60 effects a rocking of the shaft 51 to apply the brakes through either of the adjusting elements 58 and 59 depending upon the direction the lever is rocked and through the yoke 55 secured to the shaft 51. The construction is such that the brakes may be accurately and expediently adjusted to compensate for wear of the braking surfaces without altering the length of the brake rods by merely adjusting the positions of the elements 58 and 59 relative to the lever 60.

In order to provide an efficient construction and at the same time to cool the braking surfaces, the plates 32' and 33' are spaced from each other and as shown in Figure 3 are alternately bent in directions toward each other to form baffles 61 so arranged that they not only function to circulate the cooling medium through the member 33, but also serve to reinforce the plates against the pressure exerted thereon by the braking surfaces 32 and 41. The arrangement is such that upon rotation of the wheel, the ribs function as a fan for drawing air through suitable openings 62 formed in the opposed walls of the annular member 33 adjacent the inner circumference or base portion of the latter. Air drawn in the above manner through the openings 62 is caused to circulate between the spaced walls 32' and 33' to cool the braking surfaces 34 and 35 thereof. It will of course be understood that the ribs extend inwardly from the braking surfaces of the plates so that they will not interfere with engagement of the latter surfaces by the braking surfaces 32 and 41.

In order to prevent water or other outer impurities from contacting with the braking surfaces and actuating mechanism therefor, I provide an annular closure member 63 bridging the space between the outer peripheral portions of the backing plate 23 and disk 27. The member 63 is preferably formed of light gage metal and is held in assembled relation with the wheel by the pins 28. In this connection it will be noted from Figure 2 that the flange 21 of the plate 19 also functions to prevent water and the like from entering the space between the braking surfaces. The construction illustrated in Figure 7 is substantially the same as the arrangement hereinbefore set forth with the exception that I provide an annular flange 65 on the brake member 33 intermediate the flange 21 on the plate 19 and the inner annular edge portions of the brake members 27 and 40. The purpose of this flange is to protect the braking surfaces of the various brake members from moisture or other impurities.

Thus, from the foregoing it will be apparent that I have provided an improved brake of the radial type for vehicle wheels composed of a relatively few number of parts and wherein means is provided for effectively cooling and reinforcing the braking surface areas. It will further be observed that I have provided improved means for actuating the braking surfaces distinguished by its simplicity in construction and operation permitting the brakes to be operated with a minimum amount of effort.

What I claim as my invention is:

1. A vehicle wheel including, a hub, an annular ring member having axially spaced walls and secured to the wheel concentric with the axis of the hub with the walls aforesaid extending radially of the wheel forming braking surfaces and having circumferentially spaced inwardly extending projecting portions, an annular flange carried by the wheel co-axially with the hub and having circumferentially spaced slots therein slidably receiving the projecting portions aforesaid for supporting the ring upon the wheel, an annular member mounted on said wheel in fixed relation to said ring and having a radially extending braking surface positioned adjacent one of the braking surfaces aforesaid, a second annular member mounted upon said wheel for movement axially of the hub and having a braking surface positioned adjacent the other of said first mentioned braking surfaces, and means for actuating said last mentioned member to engage the same with the ring and move the latter axially on said securing elements into engagement with said fixed braking member.

2. A vehicle wheel having relatively movable braking surfaces, means for affecting a relative movement of said surfaces including, a rockshaft, a yoke member secured to said rockshaft and having spaced radially projecting arms, adjustable members carried by said arms and having portions extending inwardly toward each other, and a rockable lever having a portion extending between said arms in a position to alternatively engage said adjustable elements for actuating said yoke member to rock the shaft.

3. A vehicle wheel having a hub, a backing plate mounted upon the hub, an annular disk member extending radially of the wheel in spaced relation to the backing plate, means for securing said disk to the plate in spaced relation thereto including pins extending between the latter and disk, a second annular disk member extending radially of the wheel and slidably mounted on said pins intermediate the plate and first mentioned disk, a braking element mounted for sliding movement between said disk members and means carried by the plate for sliding said second disk along said pin into engagement with the braking element to move the same into contact with said first mentioned disk.

4. A vehicle wheel provided with a radially extending braking member having circumferentially spaced reinforcing ribs extending laterally from one side thereof, a cooperating member engaging the ribs aforesaid and having reinforcing ribs extending laterally therefrom toward the first named member and engageable therewith intermediate the ribs aforesaid to cooperate with the same in forming air passages between the members.

5. A vehicle wheel provided with annular radially extending braking members having radially projecting reinforcing ribs extending laterally from adjacent sides of the members and alternately engaging said sides at circumferentially spaced points to provide radially extending air passages therebetween.

6. A vehicle wheel provided with axially spaced radially extending braking members having hollow reinforcing ribs forming passages for air and extending laterally from adjacent sides of said members for alternately engaging said sides at circumferentially spaced points to provide additional passages for air between said members.

JOSEPH E. BATIE.